United States Patent [19]

Liu

[11] Patent Number: 5,594,807
[45] Date of Patent: Jan. 14, 1997

[54] SYSTEM AND METHOD FOR ADAPTIVE FILTERING OF IMAGES BASED ON SIMILARITY BETWEEN HISTOGRAMS

[75] Inventor: Dong-Chyuan Liu, Mercer Island, Wash.

[73] Assignee: Siemens Medical Systems, Inc., Iselin, N.J.

[21] Appl. No.: 363,191

[22] Filed: Dec. 22, 1994

[51] Int. Cl.$^6$ ........................................................ G06K 9/40
[52] U.S. Cl. ........................... 382/128; 382/168; 382/261
[58] Field of Search ..................................... 382/128, 168, 382/170, 171, 260, 261, 275; 364/413.25, 724.19; 128/660.01, 662.02; 348/607, 163

[56] References Cited

U.S. PATENT DOCUMENTS

| | | | |
|---|---|---|---|
| 4,729,019 | 3/1988 | Rouvrais | 358/112 |
| 4,783,839 | 11/1988 | Bamber | 382/54 |
| 5,050,226 | 9/1991 | Collet-Billon | 382/54 |

FOREIGN PATENT DOCUMENTS

WO86/03594  6/1986  WIPO ............................... G01S 7/62

OTHER PUBLICATIONS

"Acoustic Attenuation Estimation for Soft Tissue from Ultrasound Echo Envelope Peaks," Ping He, *IEEE Transactions on Ultrasonics, Ferroelectrics, and Frequency Control*, vol. 36, No. 2, pp. 197–203, 1989.

"Application of stochastic analysis to ultrasonic echoes— Estimation of attenuation and tissue heterogeneity from peaks of echo envelope," Ping He & James F. Greenleaf, *J. Acoust. Soc. Am.*, vol. 79(2), pp. 526–534, Feb. 1986.

"Rational Gain Compensation for Attenuation in Cardiac Ultrasonography," Hewlett Melton & David Skorton, *Ultrasonic Imaging*, 5, pp. 214–228, 1983.

"Quantitative Volume Backscatter Imaging," Matthew O'Donnell, *IEEE Transactions on Sonics and Ultrasonics*, vol. 30, No. 1, pp. 26–36, 1989.

"Attenuation measurement uncertainties caused by speckle statistics," Kevin Parker *J. Acoust. Soc. Am.*, vol. 80(3), pp. 727–734, Sep. 1986.

"Estimation of Local Attenuation from Multiple Views Using Compensated Video Signals," K. J. Peters, et al., *Acustica*, vol. 79, pp. 251–258, 1993.

(List continued on next page.)

*Primary Examiner*—Andrew Johns
*Attorney, Agent, or Firm*—Jeffrey Slusher

[57] ABSTRACT

An interrogation region, such as a portion of a patient's body, is imaged as an unfiltered pattern of image elements, to each of which is assigned a numerical value such as brightness. One element is selected either automatically or manually as a reference element, which lies in a substantially homogeneous image portion. For ultrasonic imaging, the homogeneous portion preferably corresponds to a region of speckle noise. A reference histogram of the numerical values is then accumulated for all the elements in a region or window about the reference element. All of the remaining elements are sequentially designated as current elements, for each of which a current histogram is accumulated. Each current histogram is compared with the reference histogram using an error function for each corresponding pair of histogram bins. The error function values for all bins, which may be normalized and weighted, are used to generate a similarity value between the current and reference histograms. The more similar to the reference histogram the current histogram is, the more strongly it is assumed that the current element lies in a homogeneous portion of the image, and the greater it is smoothed. All possible error function values may be prestored to increase computation speed. The degree of smoothing may be adjusted by the user. The user preferably also may adjust a comparison factor, which determines how strongly a difference between a current and a reference bin will contribute to the similarity value.

15 Claims, 5 Drawing Sheets

OTHER PUBLICATIONS

"Adaptive Time Gain Compensation for Ultrasonic Imaging," S. D. Pye, et al., *Ultrasound in Med. & Biol.*, vol. 18, No. 2, pp. 205–212, 1992.

Bamber, et al., "Fast image processing systems for evaluating the clinical potential of ultrasound speckle suppression and parametric imaging," SPIE vol. 1092, Medical Imaging III: Image Processing, pp. 33–39, 1989.

Bamber & Daft, "Adaptive filtering for reduction of speckle in ultrasonic pulse-echo images," Ultrasonics, pp. 41–44, 1986.

Bamber & Daft, "Intelligent Filtering for the Suppression of Speckle in Ultrasonic Pulse-Echo Images," WFUMB 1985, p. 545.

Bleck, et al., "Intelligent two-dimensional filter in the diagnosis of diffuse and focal liver disease," AIUM, 1991.

Huang, et al., "A Fast Two-Dimensional Median Filtering Algorithm," IEEE Transactions on Acoustics, Speech, and Signal Processing, vol. ASSP-27, No. 1, pp. 13–17, Feb. 1979.

Kuc, "Ultrasonic Tissue Characterization Using Kurtosis," IEEE Transactions on Ultrasonics, Ferroelectrics, and Frequency Control, vol. UFFC-33, No. 3, pp. 273–279, May 1986.

Loupas, et al., "An Adaptive Weighted Median Filter for Speckle Suppression in Medical Ultrasonic Images," IEEE Transactions on Circuits and Systems, vol. 36, No. 1, pp. 129–135, Jan. 1989.

Magnin, et al., "Frequency Compounding for Speckle Contrast Reduction in Phased Array Images," Ultrasonic Imaging 4, pp. 267–281, 1982.

Thijssen, et al., "Gray Level Transforms and Lesion Detectability in Echographic Images," Ultrasonic Imaging 10, pp. 171–195, 1988.

Trahey, et al, "Speckle Pattern Correlation with Lateral Aperture Translation: Experimental Results and Implications for Spatial Compounding,", IEEE Transactions on Ultrasonics, Ferroelectrics, and Frequency Control, vol. UFFC-33, No. 3, pp. 257–264, May 1986.

Tuthill, et al., "Deviations from Rayleigh Statistics in Ultrasonic Speckle," Ultrasonic Imaging 10, pp. 81–89, 1988.

FIG. 4
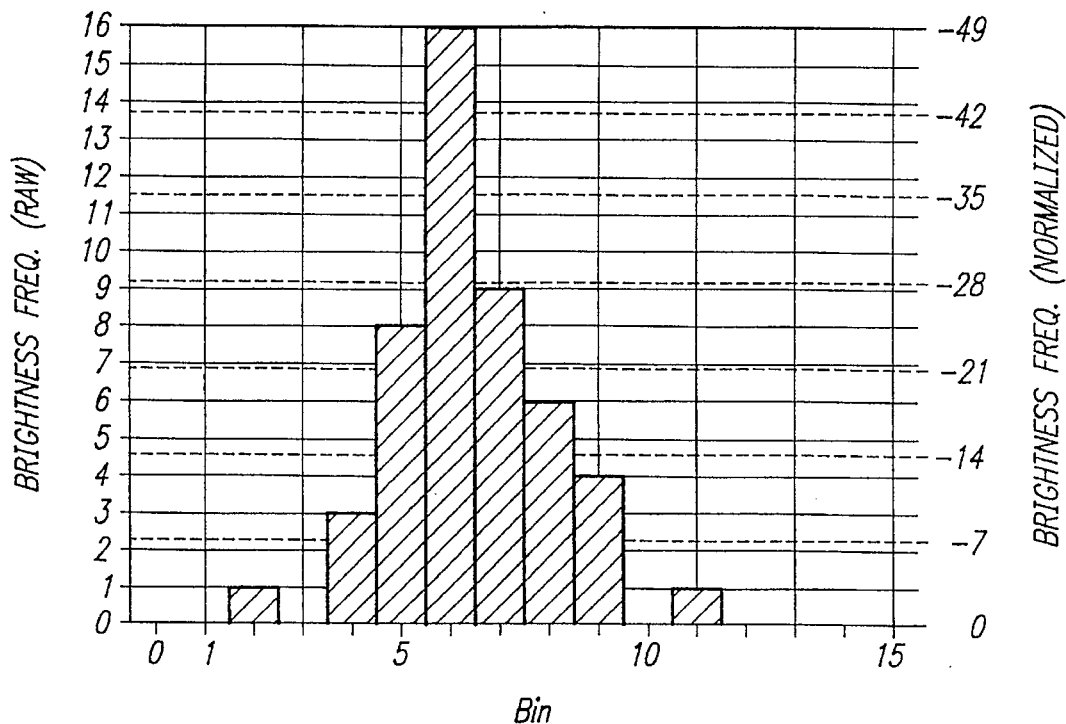
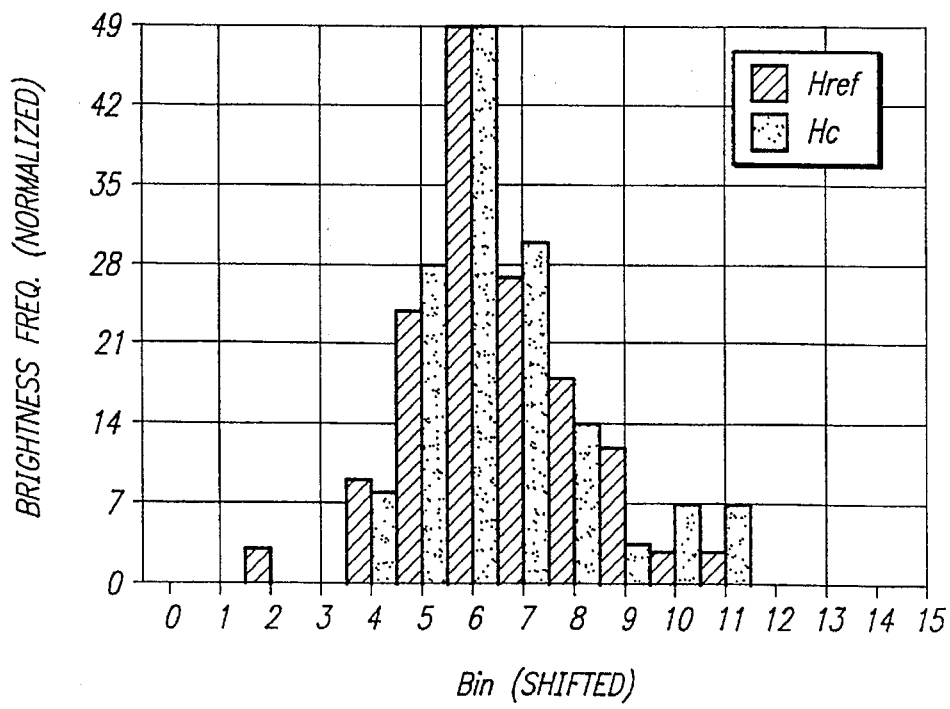
FIG. 5

SYSTEM AND METHOD FOR ADAPTIVE FILTERING OF IMAGES BASED ON SIMILARITY BETWEEN HISTOGRAMS

BACKGROUND OF THE INVENTION

1. Field of the Invention

This invention relates in general to a system and a method for post-production filtering of noise from digitized images. The invention relates in particular to filtering the noise commonly known as "speckle" from medical ultrasonic images.

2. Description of the Related Art

When an object is scanned by some form of radiation, structures within the object that are too small to be resolved may still disperse, reflect, or otherwise interfere with the signal that is returned to the scanning device. When the device then creates an image based on the returned scan signal, this interference, which is noise, often makes the image less clear.

In medical ultrasonic imaging, the ultrasonic beam transmitted into the body is scattered by the microstructure of the tissue. This interference effect is known as "speckle." Speckle causes the image to appear granular, which in turn obscures smaller structures and masks the presence of low-contrast lesions. The problem is analogous to "snow" on a television screen, which reduces the "sharpness" of the TV image.

Although ultrasonic images are corrupted by speckle, they contain a variety of features should be preserved. Existing image filtering methods, however, typically either introduce severe blurring and loss of diagnostically useful free structures or they do not properly suppress the speckle noise composed of low spatial frequencies. In other words, these methods either "smooth" the parts of the image one wishes to keep sharp (the useful signal) along with smoothing out the noise, or they fail to eliminate noise that itself is relatively "smooth."

One known way to try to reduce the speckle is to average multiple images of the same object structure. Using this method, each image is obtained by varying one or more system parameters so that the speckle patterns in the images are decorrelated. This reduces the variance of the speckle and improves the contrast resolution, that is, the ability to distinguish between two regions of different mean gray level. One may also reduce the variance of the speckle by adaptively smoothing the image through a two-dimensional filter.

Several other image filtering methods have been developed for speckle reduction. Most of these known methods include two parts. First, a single quantity is computed from the local statistics of the image; then, this quantity is used as the input to an adaptive filter, which smoothes out the speckle.

These techniques share the same imaging processing standard, which is that, for each of the pictures elements ("pixels") that make up the image, the current pixel (the image point) is updated with respect to certain conditions through a running window (a local region). The size of the window, which is equivalent to the number of pixels allowed to contribute to the computation, is limited because the signal preservation (for example, of edges, fine structures, and the interface between different organs) deteriorates rapidly as the window size increases. However, a small window may not provide a reliable computational result, especially for computing the "moment statistics" which normally form the basis for these known methods. In other words, if too many other neighboring pixels are allowed to influence the assumed "correct" value of any given pixel, then the "unique" information contained in the pixel may be lost or at least "watered down," but if not enough pixels are considered, then one cannot form an estimate of the general statistical properties in the area of the pixel that is reliable enough to allow one to identify and eliminate the speckle.

In "Adaptive filtering for reduction of speckle in ultrasonic pulse-echo images", Ultrasonics, pp. 41–44, 1986, Bamber and Daft describe a method in which the ratio of the local variance and local mean of the image is used to determine the degree of similarity between the image information and reference information. In "Fast image processing systems for evaluating the clinical potential of ultrasound speckle suppression and parametric imaging", SPIE Vol. 1092, Medical Imaging III: Imaging Processing, pp. 33–39, 1989, Bamber et al. describe using a quantity derived from the ratio of the local mean and local standard deviation as the similarity factor.

Using the numerical quantity of the local statistics in a running window (a local region) to trace back the characteristic of the imaging system is, however, limited by at least the following factors: First, the calculated moment statistics (such as the estimated mean, variance, skewness, and kurtosis) from small number of pixels (the image points) may often not converge to the real moment statistics and they typically show large variance (the large perturbation). Second, ultrasound speckle is related to both tissue properties and the system characteristics of the imager; consequently, it is impossible to adequately represent these many properties and characteristics in a single quantity derived from the local statistics of the image.

In "An adaptive weighted median filter for speckle suppression in medical ultrasound images", IEEE Trans. Circuits Syst., Vol. 36, No. 1, pp. 129–135, 1989, Loupas et al. presented a method for suppressing ultrasound speckle by using a nonlinear filter called an adaptive weighted median filter. The weight coefficients used in this filter were, however, once again adapted from the single quantity of the ratio of the local variance to the local mean of the image. This method consequently also suffered from the same difficulty of reliably evaluate the statistics parameters. Moreover, the median operation does not properly suppress the ultrasonic speckle noise composed of low spatial frequencies, and the adaptive weighted median filter does nothing near edges because of a large variance of the data samples in the fixed local region.

One other drawback of most existing speckle-reduction methods is that they are computationally intensive. For example, calculating variances and mean values in local regions of common sizes typically involves several multiplications. This reduces the usefulness of such techniques for high-speed (preferably "real-time") imaging with high resolution (large numbers of pixels).

What is needed is therefore a system and a method that suppresses speckle in ultrasonic images better than is possible using current solutions, that does so in a computationally more efficient way, and that better preserves the fine structures of images.

SUMMARY OF THE INVENTION

According to the invention, an interrogation region is imaged first by generating a multi-dimensional, unfiltered image of the interrogation region as a pattern of image elements and by assigning to each image element one of a predetermined, finite number of numerical values corresponding to a predetermined imaging property of the interrogation region. For medical ultrasonic imaging, the image elements are typically displayed as pixels, and the imaging property is the brightness value of the corresponding pixel. The image is displayed on a conventional general or dedicated display monitor.

A reference element is then selected in a substantially homogeneous portion of the displayed image. Selection of the reference element may be manual, for example using a cursor controller for the display monitor, or automatic, in which case the statistics of a plurality of unfiltered image elements are compared and the reference element is selected as the one of the unfiltered image elements whose statistics most closely correspond to a predetermined homogeneity condition. A reference histogram is then accumulated in a memory unit by a processor as a reference frequency distribution of the numerical values of all image elements in a reference region, which includes the reference element.

The processor then sequentially designates each image element as a current element. For each current element, the processor accumulates in a current histogram a current frequency distribution of the numerical values of all image elements in a current region, which includes the current element. For each current element, the processor then determines a similarity value between the reference histogram and the current histogram. Each current element is then displayed with an updated, filtered value, which is a predetermined filtering function of the corresponding similarity value.

In one embodiment of the invention, the similarity value is generated from a similarity function that includes a comparison factor. Depending on the setting of the comparison factor, which may be automatic or manually adjustable, the similarity function varies between a minimum and maximum value. When the comparison factor is manually adjustable, the user adjusts the factor until a user-defined noise removal level is reached for the displayed image.

The reference and current histograms are preferably stored in a plurality of respective reference and current memory locations as a plurality of reference and current bins, in which each bin corresponds to a predetermined range of numerical values of the imaging property, and into each of which is accumulated the number of image elements in the reference or current region whose numerical values fall within the range of the corresponding bin. For each reference bin and corresponding current bin, the processor generates an error function value and the similarity value as a predetermined similarity function of the error function values. In one embodiment of the invention, all possible error function values are prestored in memory for arbitrary reference bins and current bins.

In order to counteract the effect of time gain attenuation, the reference histogram bin in whose range a greatest number $B_{peak}$ of reference elements' numerical values lie is determined. For each current histogram, the processor then determines the current histogram bin in whose range the greatest number of current elements' numerical values lie. All bins of the current histogram are then scaled by a normalization factor such that the bin in whose range the greatest number of elements' numerical values lie is assigned the value $B_{peak}$. All possible normalization factors for the given number of image elements in the reference region may be, and preferably are, prestored in the memory unit.

In order to incorporate skewness and kurtosis information in the filtering method according to the invention, the histograms are partitioned into left and right halves, with an equal number of bins in either half. The ranges of the bins in the left and right halves, respectively, are then adjusted to be proportional to the respective total widths of the left and right halves. The processor then generates the error function values as a function of separate weights for histogram bins in the left and right halves, with the weights proportional to a reciprocal of a ratio of the total widths of the left and right halves.

In a preferred embodiment of the invention, each current element is displayed with a respective numerical value in a range from its unchanged value to a maximum filtered value as a function of the corresponding similarity value and a smoothing factor. The smoothing factor is adjusted by the user until a user-defined noise removal level is reached for the displayed image.

Also in the preferred embodiment of the invention, the similarity values fall into a predetermined number of similarity ranges. For each similarity range and for each current element, the processor stores a corresponding average sub-region value that is an average of the numerical values of the image elements in a corresponding sub-region, which includes the current element, of the current region. Each current element is then displayed with a respective numerical value in a range from its unchanged value to the average sub-region value of the sub-region in whose range the similarity value of the current element lies.

The invention is particularly well suited for use in medical ultrasonic imaging, whereby the interrogation region is a portion of a patient's body. The multi-dimensional image of the interrogation region is generated as a two-dimensional image by applying to the interrogation region an ultrasonic scan signal, for example, from a transducer, sensing a corresponding ultrasonic return signal, and by converting the ultrasonic return signal, using a beamformer, into the pattern of pixels. Each pixel is assigned one of a predetermined, finite number of brightness values corresponding to a predetermined acoustic property of a corresponding portion of the interrogation region. The user (or the system itself, if set to automatic selection) selects as the reference element a reference pixel in the substantially homogeneous portion of the displayed image such that pixels in the substantially homogeneous portion with substantially different displayed brightness values than those of adjacent pixels can be assumed to result from speckle noise.

BRIEF DESCRIPTION OF THE DRAWINGS

FIG. 4 illustrates a brightness histogram compiled for a window about a reference pixel for a two-dimensional image.

FIG. 5 shows an example of a reference histogram compared with a current brightness histogram for a pixel in a 2-D image.

DETAILED DESCRIPTION

This invention can be used for post-information filtering of digitized images that are obtained from a wide variety of scanning technologies. These include most radiological medical scans such those used to form PET, CAT and MR/(magnetic resonance imaging) images, and phased array scans using various spectra, such as radar and sonar. The invention is described below, however, with reference to its use in filtering out speckle from images obtained from medical ultrasonic scanning. The invention is especially useful in this field because speckle is a particularly prevalent problem when scanning with the relatively long wavelengths of ultrasound.

Figure 1:
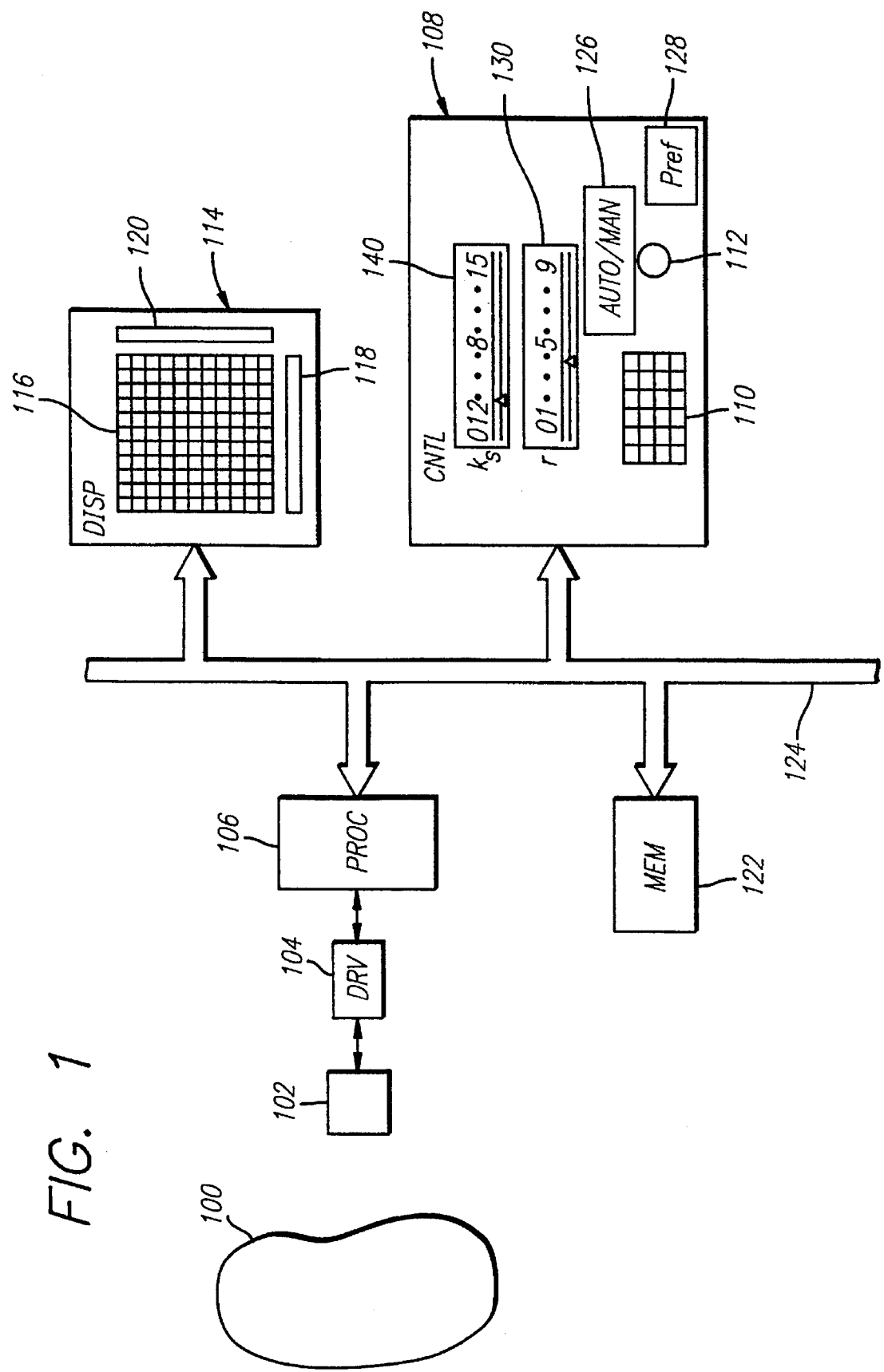
FIG. 1 illustrates the main components of an imaging system according to the invention.

FIG. 1 illustrates the main components of a system for scanning a region 100. Depending on the radiation used, this region may for example be a portion of the atmosphere (for radar), of a sea (for sonar), or of some area of a human body (for PET, CAT, MRI, ultrasound, and other radiological medical technologies). A transducer 102 applies a scanning signal to the region 100. Power and control signals to the transducer are provided by a conventional signal conditioning and drive circuit 104. The scanning and firing parameters for the drive circuit are generated by a processor 106. The user enters conventional scanning parameters and directs the scan through a control device 108, which may include any number of conventional input devices such as a keyboard 110, and a mouse, trackball, or other conventional cursor control device 112.

The return signal from the region 100 to be scanned is converted using any known techniques into a two-dimensional visual image. This image is displayed to the user on a display monitor 114. The monitor 114 may use any known technology such as a cathode-ray, plasma, or light-emitting diode screen 116, to display the image as a two-dimensional pattern of picture elements ("pixels") with different brightness values. The display may include other display fields 118, 120 to show, for example, size and distance scales, indications of signal strength, and date and time information. The display preferably includes a cursor, whose position on the screen 116 is controlled in any conventional manner by the control device 112.

As is described below, the invention may be used to scan images of more than two dimensions. In all cases, however, the image will be represented a series of image elements. For two-dimensional imaging, the image element will be the pixel.

One or more conventional memory circuits 122 electronically store the controlling programs and parameters for the processor 106, control device 108, and monitor 114, as well as the data corresponding to the brightness values for at least one displayed array of pixels. The memory circuits 122 may be external or internal to any or all of the processor 106, control device 108, and monitor 114. A conventional bus circuit 124 may be used to electrically connect and transfer data between the processor 106, control device 108, monitor 114, and, depending on the application, the drive circuit 104 and other conventional devices.

The invention is not limited to applications with active transducers that both generate the scanning signal and sense the return signal from the scanned region; rather, the invention may also be used where the transmitting device (which, indeed, may be in the scanned region 100 itself) or the device that induces a return signal from the region 100 is separate from the device that senses the return signal. Thus, the invention may be used to improve the quality of, for example, images from MRI systems.

In the context of medical ultrasonic imaging, the region 100 will be some portion of a patient's body, such as an organ, the interior of a blood vessel, or other tissue, or a combination of these or other parts of the body. The transducer 102 will typically be a phased array of piezoelectric elements and is normally included in a scanhead. The transducer 102 typically both transmits and receives the ultrasonic signal. The monitor 114 displays a well-known "sonogram" 200, which is a two-dimensional array of pixels, in which the brightness of each pixel corresponds to the strength of the ultrasonic signal returned from the corresponding portion of the scanned region of the body and is displayed on the monitor 116. For each pixel there will typically be at least one digital memory word in the memory 122 that holds the digital value corresponding to the brightness with which the pixel is to be displayed.

Figure 2:
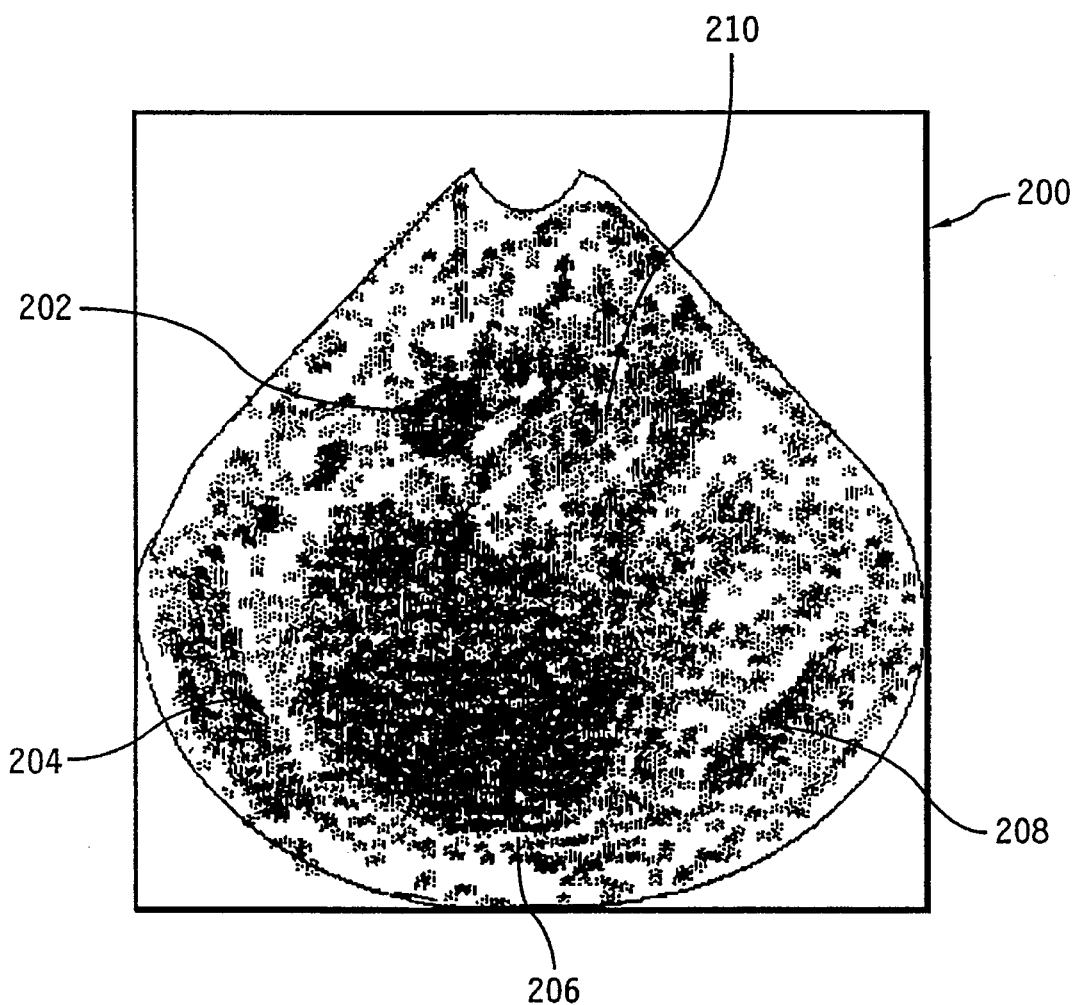
FIG. 2 illustrates a two-dimensional ultrasonic image.

FIG. 2 illustrates a conventional sonogram. Note that a sonogram is most often roughly "fan-shaped," that is, approximately a circular sector, since this is the shape of the portion of the plane of the region of the body that is "swept" or scanned by the ultrasonic signal that radiates into the body from the transducer 102. The typical range of resolution for a sonogram is on the order of 25 data points (corresponding to pixels) per $mm^2$ of tissue scanned. The invention is, however, not limited to any particular large-scale shape of display, nor to any particular image resolution.

As is well know in the field of sonography, assuming no noise or attenuation, the strength of the return signal from a given scanned tissue or fluid portion will depend on such factors as the density and the acoustic impedance of the portion relative to that of adjacent portions. In a typical sonogram, the brightness of a displayed pixel is a function of the strength of the return signal from the corresponding portion. Structural features of the scanned region, for example, lesions, arterial walls, cysts, and cavities, will normally appear brighter or darker than surrounding areas of the sonogram. Acoustically (and, therefore, usually structurally) homogeneous areas typically are, or should be, represented as areas of uniform brightness in the sonogram. In the hypothetical sohogram illustrated in FIG. 2, the areas labelled 202, 204, 206, and 208 would most likely correspond to structural features of the scanned body region. Experience may indicate to the user, however, that the area labelled 210 corresponds to a substantially homogeneous portion of the scanned region.

Figure 3:
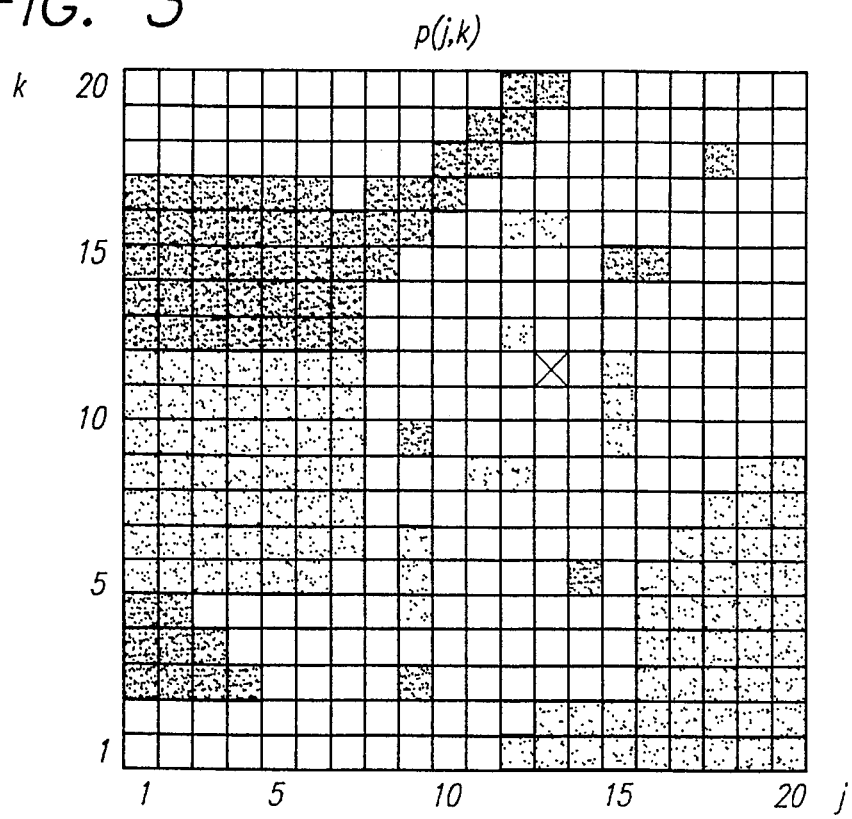
FIG. 3 illustrates a portion of a two-dimensional image that is as it displayed as an array of picture elements with different gray values.

FIG. 3 illustrates a 20×20-pixel portion of a scan image as it might be displayed on a two-dimensional display. The approximate scan area of an actual ultrasonic scan generated by typical existing devices with conventional resolution is 1.3 $mm^2$; the invention is not limited to any particular maximum number of pixels, and the minimum number of pixels necessary to use the invention will become clear below. Each pixel is shown as being square for the sake of clarity only; in many displays, for example, pixels are made up of one or more dots. The invention is not limited to any particular pixel shape, although, in order to maintain convenient indexing, it is computationally advantageous if the pixels are evenly or at least regularly distributed according to some set of coordinate axes.

Each pixel has a gray-scale brightness that may vary from pure white (100% luminance) to pure black (0% luminance). The number of different gray tones that a pixel may have is determined by the size of the memory data word that holds the numerical brightness parameter for that pixel. For example, assume that the memory 122 (FIG. 1) stores the brightness value for each pixel as an 8-bit data word. It would then be possible to represent $2^8=256$ different levels of grayness, with, for example "255", corresponding to maximum displayable brightness and "0" corresponding to maximum displayable darkness. The value "128" would in this case correspond roughly to "medium gray".

In FIG. 3, the horizontal index is labelled "j" and the vertical index is labelled "k": both indices range from 1 to 20. The brightness value of the pixel located at horizontal position j and vertical position k is p(j,k). The phrase "pixel p(j,k)" is to be understood as "the pixel at position j,k" or "the brightness value of the pixel at position j,k"; the correct interpretation will be obvious from context. For example, pixel p(1,15) in FIG. 3 is darker than pixel p(10,17).

According to the invention, one of the pixels in a "speckle region" of the displayed imaged is selected as a reference pixel. A "speckle region" is a portion of the displayed image that is determined to represent a position of the scanned region that is homogeneous, with little or no distinguishable structure, so that differences in pixel brightness are a result of small-scale scattering, that is, noise.

Both manual and automatic reference pixel selection are possible according to the invention. If both alternatives are made possible to the user, then a selector 126, which may be a simple switch (or a soilware entry via the keyboard 110), is included in the control panel. The position of the switch indicates to the processor how the reference point is to be selected.

For manual reference point selection, the user maneuvers the cursor controller 112 (FIG. 1), such as a trackball or mouse, until the cursor on the display appears over or at least very near the desired reference pixel. The user can then indicate that the corresponding pixel is to be used as the reference pixel either by a conventional keyboard entry or by activating a selector indicator 128, which may be a simple switch. Automatic reference pixel selection is described below. Note that there will normally be many possible choices for the reference pixel that will lead to an improved filtered image. In FIG. 3, the reference pixel $p_{ref}$ is p(13,12), and has been marked with an "x" for clarity.

Once a reference pixel has been chosen, a reference window is selected around the reference pixel. The reference window is a group of adjacent pixels that includes the reference pixel. The size of the reference window may either be predetermined and fixed, or it may be chosen automatically or manually for each image or sequence of images. The reference window should include enough pixels that the brightness histogram is statistically meaningful: the window should be large enough that it includes some speckle, but ideally not so large that it includes regions of the image that indicate structure. The best window size for any given application will depend on the resolution of the image. The lower the resolution, the larger the window may have to be for it to be statistically meaningful. Window size will also depend on the achievable computation speed (depending on the speed of the processor, real-time image processing may not be possible if the window is chosen to be too large), and can be determined by calculation and experiment. These concepts and criteria are made clearer below.

In the context of medical ultrasonic imaging, in order to have reliable speckle statistics, the window should be big enough to cover a region with a high density of scatterers. Tuthill, et al., have shown in "Deviation from Rayleigh statistics in ultrasonic speckle," 10 Ultrasonic Imaging 81–89, 1988, that the density of scatterers should be at least 5 per pulse width in order to approach a fully developed speckle region with Rayleigh distributions. The pulse width $\Delta T$ is defined by $4\sigma$ where $\sigma$ is the Gaussian standard deviation of a Gaussian-enveloped pulse in the time domain. For a scanning depth of Z mm and N pixels in the axial direction, after the conventional scan conversion the minimum window size m in the axial direction should therefore be $m=(N \cdot \Delta T \cdot C_0) / (2Z)$, where $C_0$ is the speed of sound.

In one test of the invention on ultrasonic images, a 1.6 µs pulse width was used with a 100 mm scanning depth and 512 sampling points in the image. These values are typical in medical ultrasonic imaging, but are not required according to the invention. In this case, m=6.3, so that a window of 7×7 is big enough to cover a speckle region. This window size of 7×7 was found to provide good filtering results.

A window size of 7×7 is therefore assumed in this explanation by way of illustration only. Any m×n window may be used. Depending on the area of application and imaging technology, there may be no reason to assume information is direction-dependent. In these cases, the window is preferably square and in order for the reference window to be centered about the reference pixel, the number of pixels on each side of the window is preferably odd. If, however, imaging information is direction-dependent (non-isotropic), then non-square windows may be chosen.

Once a reference window has been chosen, a reference histogram is compiled for the reference window, which indicates how many pixels in the reference window have brightness values in predetermined intervals. There will typically be many more possible brightness values for a given pixel than there will be pixels in a chosen window. For example, if each pixel is represented as an 8-bit data word and the window is 7×7, then the 49 pixels in the window could theoretically each have any of 256 different levels of grayness. If the number of pixels for each individual brightness value were to be accumulated, then at least 256–49= 207 (and probably many more) of the entries would be "empty" (zero pixels with the corresponding brightness values) and the histogram itself would in most cases be almost flat everywhere else.

In implementations of the invention, there is no need to actually display a histogram; actual graphically illustrated histograms are shown in the drawings for the sake of clarity only. In this description of the invention, "histogram" is to be understood as meaning the accumulation into a number of memory positions of the number of pixels whose brightness (or other) values fall in the range assigned to the corresponding memory position. "Bins" of histograms are thus the memory positions. Histograms will normally be vectors (linked series of memory positions) whose elements are the "bins." It would be possible, however, to display at least the reference histogram on the display in a test or calibration mode to give the user an indication of the general properties of the current image.

In order to accumulate a histogram with a shape that provides statistically significant information (discussed below) about the reference window, the possible pixel brightness values are therefore grouped into intervals or "bins". The number of bins one chooses represents a trade-off between noise tolerance and sensitivity. The number used will determine the smoothness of the histogram and can be determined by calculation and experiment for any given application, but in general the number of bins should be from about one-fifth to about one-half the number of pixels in a window. Furthermore, it is computationally advantageous if the number of bins is a power of two since the number of bins will then usually divide evenly into the number of possible pixel brightness values, which will also typically be a power of two. In the prototype of the invention that is discussed and illustrated here, the number of brightness groups or "bins" is 16, in which each bin represents an interval of 256/16=16 brightness values.

In other words, pixels are tallied in bins as follows:

| Pixel brightness | Bin |
|---|---|
| 0–15 | 0 |
| 16–31 | 1 |
| 32–47 | 2 |
| 48–63 | 3 |
| 64–79 | 4 |
| 80–95 | 5 |
| 96–111 | 6 |
| 112–127 | 7 |
| 128–143 | 8 |
| 144–159 | 9 |
| 160–175 | 10 |
| 176–191 | 11 |
| 192–207 | 12 |
| 208–223 | 13 |
| 224–239 | 14 |
| 240–255 | 15 |

This is of course only one example of the many acceptable choices of how pixel brightness values can be grouped and ordered.

FIG. 4 illustrates a hypothetical reference histogram based on a 7×7 reference window. In this example, 16 of the 49 pixels had brightness values in the range of Bin 6, nine lay within the range of Bin 5, and so on.

At the heart of all filtering systems is a model, that is, an assumption of what characteristics a "noise" signal would have. The actual, received signal is then compared with this reference. If the characteristics of the actual signal deviate greatly or systematically from the assumed reference, then one also assumes that the deviation is not just the result of intermittent or isolated random noise. A poor model therefore leads to poor filtering in the sense that too much of the useful signal is rejected or too much of the noise is retained.

Many conventional systems assume that speckle noise in ultrasonic applications represents a deviation from a model that has some fixed statistical distribution. Bamber's system, for example, assumes a Rayleigh distribution. There are two problems with this approach. First, even if the assumption works adequately for filtering out speckle from ultrasonic images, it may be completely inadequate for images obtained using other technologies, or for ultrasonic scans of regions other than in a human body. Second, the Rayleigh distribution is only an approximation, and it is unlikely that any region of a given ultrasonic image will conform perfectly to this predetermined distribution. Note, however, that the reference histogram generated according to the invention represents "reality", that is, the actual brightness distribution in a region of the reference pixel. According to the invention, the reference histogram, as its name implies, forms the basis for deciding to what extent a particular pixel's brightness value is "signal" and to what extent it is "noise", and for changing its value accordingly.

In order to establish a uniform scale for comparison of different histograms, each value of the reference histogram (and later, each current histogram) is preferably normalized so that the value of the "peak" is equal to the number of pixels in a window, in this case, 49. In FIG. 4, the most frequent brightness values fall in Bin 6—sixteen pixels in the window had brightness values within the corresponding range. The peak bin is therefore number 6, which has a value $B_{peak}=16$. The values of all bins are therefore normalized by multiplying by 49/16. The normalized brightness scale is shown to the right in FIG. 4.

According to the invention, normalization may also be speeded up by precomputing and storing the possible normalized values in a normalization look-up table $H_{norm}$ or matrix with $(D_{max}+1)$ rows and $(D_{max}+1)$ columns. The value of the table or matrix for row i and column j would then be:

$$H_{norm}(i,j)=RND(i \cdot j/D_{max});$$

where $i=0, 1 \ldots D_{max}$; $j=0, \ldots, i$; and RND indicates that the values are rounded either up or down to the nearest integer. Note that $H_{norm}(i,j)$ is triangular, which reduces the number of memory positions needed to store the table. For $D_{max}=49$, $H_{norm}$ would have the following form:

TABLE 1

| Maximum brightness frequency | Bin frequency | | | | | | | | |
|---|---|---|---|---|---|---|---|---|---|
| $B_{peak}$ | 0 | 1 | 2 | 3 | — | 7 | — | 14 | — | 49 |
| 0 | 0 | | | | | | | | |
| 1 | 0 | 49 | | | | | | | |
| 2 | 0 | 25 | 49 | | | | | | |
| 3 | 0 | 16 | 33 | 49 | | | | | |
| — | | | | | | | | | |
| 7 | 0 | 7 | 14 | 21 | — | 49 | | | |
| — | | | | | | | | | |
| 14 | 0 | 4 | 7 | 11 | — | 25 | — | 49 | |
| — | | | | | | | | | |
| 49 | 0 | 1 | 2 | 3 | — | 7 | | | — | 49 |

For example, if 14 pixels are in the peak bin ($B_{peak}=14$) then the value 49 is entered for this bin (it is normalized to $D_{max}$). Row 14 then becomes the "normalization row". If a different bin holds three pixels, then rather than compute the normalized value, the processor enters the table at row 14 under the column for bin frequency=3 and retrieves the normalized value 11 for the bin. Note that this look-up table can be precomputed once and used for all histograms in an image.

As is explained in greater detail below, a brightness histogram is compiled for every pixel in the image (with exceptions noted below) and the similarity between each current histogram and the reference histogram is measured. The measure of similarity is then used to update the brightness value of the pixel. The similarity measure and the updating procedure are explained below.

As is well known in the field of ultrasonic imaging, the signal to and from an interrogation region will often be attenuated by tissue it must pass through on the way to and from the interrogation region. This means that two regions with identical acoustic characteristics would return different signals. Assuming attenuation were the dominating distortion, the signal that must take longer time to pass through intermediate tissue would appear "scaled down" relative to the other, that is, it would appear uniformly more or less bright than the other, and by roughly a constant factor. One known way of eliminating this effect of "time gain attenuation" is "time gain compensation," or "TGC", which attempts to compensate for attenuation that occurs between the transducer and the interrogation region.

Because the TGC function included in a system such as an ultrasonic imaging system is typically independent of frequency, it can only partially compensate the attenuation loss through tissue. In order to offset the effects of incomplete attenuation compensation after the TGC, each histogram is preferably shifted so that its "peak" coincides with the peak of the reference histogram. To understand how this works, assume that two acoustically identical interrogation regions are located at different depths in the body. The region farthest from the transducer may then return signals with the same histogram "shape" as that for the nearer region, but its histogram will be shifted in the direction of greater darkness, since each pixel brightness value will be reduced by the attenuation over a longer period of time. Shifting the histogram so that its peak corresponds with the reference peak reduces the effect on similarity evaluations of systematic changes in pixel brightness because of time gain attenuation. If perfect TGC, of any known type, is included in the system, however, so that attenuation does not affect the location of histogram peaks, the shifting of compiled histograms will not be necessary.

In the actual implementation of the invention, for each pixel window, a number of memory positions will be allocated in the memory unit 122 equal to at least the number of bins. The processor 106 then increments each bin for each pixel in the current window whose brightness value falls within the range of that bin. When all the pixels in the window have been tallied in their respective bins, the bins will hold numbers corresponding to the histogram (it is not necessary to display the actual histogram to the user). The processor then determines the "peak" of the histogram by stepping through the bins and recording the address or index of the bin with the highest number. This number is then used to normalize all bin entries either by directly changing the values stored in the bins, or by applying a normalization constant during later calculations. A preferred normalization method using a precomputed look-up table is described below. Shifting of histograms can be accomplished in any conventional manner, for example, by recording the index of the peak bin and applying an addressing or indexing offset value when accessing the value for calculations.

FIG. 5 illustrates two histograms—the reference histogram and a current histogram—that have both been normalized to have peak values of 49, and shifted so that their peaks are in registration at Bin 6, which is the peak bin for the reference histogram. In each bin, the bar shaded with hatching represents the value of the bin for the reference histogram $H_{ref}$ and the bar shaded with dots represents the value of the bin for a current histogram $H_c$, which is compiled for a window around a pixel other than the reference pixel. Note that shifting of memory data, such as that illustrated by the histograms, is typically carried out as a simple address-indexing arrangement by the processor. As such, it is not necessary for the bin "numbers" of a shifted current histogram always to fall in the range 0 to (k−1), where k is the total number of bins (here, k=16). This is shown in FIG. 5 for purposes of illustration only.

For each bin, the brightness frequency value of the two histograms is compared, that is, the values stored in the respective memory positions are compared. Preferably, for each bin, the absolute value of the difference of the two histogram values is calculated by the processor. In other words, an absolute error value $D_i(H_{ref}, H_c)$ is calculated for each of the k bins as follows:

Equation 1: $D_i = D_i(H_c(i), H_{ref}(i)) = |(H_c(i) - H_{ref}(i))|$ where i is the number of the bin, $i \in [0, (k-1)]$.

Note that if the current histogram $H_c$ is identical to the reference histogram $H_{ref}$, then $D_i = 0$ for all values of i. Note also that the greatest possible value for $D_i$ is the number of pixels in a window, which, in the illustrated example, is 49. Although it is not necessary for histogram values $H_c(i)$ and $H_{ref}(i)$, and thus the absolute error value $D_i$, to be rounded or truncated to integers, this is preferred according to the invention since it allows for pre-computation and storage in look-up tables of normalization values, as is described below.

As is discussed above, conventional filtering methods such as Bamber's measure similarity between a region of pixels and an assumed statistical model by directly computing the statistics of the window. This introduces error, since the model cannot be perfect, and slowness, since calculation of second (or higher) moments such as variance requires, for each window, at least as many multiplications as there are pixels in the window. Furthermore, the computed statistics are seldom accurate since the number of data points (pixels) used to calculate, for example, variance, is too few.

As is well known, the first and second moments for the brightness values in a window are, respectively, the mean and variance of the values. These two values determine the position of the "peak" value and also how the contained energy is distributed. On the other hand, these values are generally less indicative of similarity than such features as the comparative skewness and kurtosis of the distributions.

For example, because of time gain attenuation (explained above), two otherwise acoustically identical interrogation regions may have a large difference in mean brightness values. In this theoretical, ideal case, the histogram (brightness distribution) of the "darker" window would have exactly the same shape as the "brighter" one, but it would appear shifted in the "dark" direction and would appear "scaled down" in size. The peak normalization and bin shifting steps described above would eliminate these "false" differences and would lead to identical histograms. Perfect TGC would eliminate the need for peak shifting.

According to the invention, the weights $C_i$ are chosen to extract information about two statistically more significant indicators of similarity between the current histogram and the reference histogram. These indicators are skewness and kurtosis.

"Skewness" is a third-moment statistic that characterizes primarily the "lopsidedness" of the distribution (which, in this invention, is represented as a histogram), that is, the degree of symmetry of the distribution to either side of its peak. "Kurtosis" is a fourth-moment statistic that characterizes the relative peakedness or flatness of a distribution.

According to the invention, the symmetry of the histograms and the extension of their "tails" (bins farthest from the peak bin) are used to measure skewness. This is done preferably by selecting the weight coefficients higher for the tails of the histogram and, furthermore, setting them differently for frequency bins to the "left" and to the "right" of the peak (bins whose index represents brightness values that are less than and greater than, respectively, the bin corresponding to the most frequently occurring brightness values). Since the histograms are normalized as to their peak values, most of the information concerning the kurtosis or flatness of the histogram is located in the bins adjacent or close to the peak. In sum, the weights are preferably relatively high adjacent to the peak on either side and at the tails, but lower in between.

Since the peaks are normalized, their absolute error values will always be zero. The weight for the peak bin can therefore be set to any arbitrary value, since the product of the error value and the weight (zero) will always be zero.

The user will choose the weights for each application area and will typically apply experience, calculations, experiments, and other known techniques. In choosing the weights, the user must consider the characteristics of different technologies, transducers, and the composition of the scanned regions. Note that weights are not essential to the invention, but will often improve its filtering performance.

In one implementation of the invention, after the reference histogram was compiled, the brightness interval for its peak and its overall range were determined. A weight function was then determined by partitioning the overall brightness range into eight intervals. (Any number of intervals could be used, for example, the number of bins, but eight was found to provide acceptable filtering results with high computation speed.) Four intervals were defined to the right and to the left of the peak value. The intervals at the peak were one half as wide as the other three intervals on the same side, which had equal widths. Bins were placed in the intervals in the sense of "nearest neighbors," that is, they are processed according to the interval they fall most within or are closest to.

Assume the width—defined as the range of brightness values or number of bins—to the left of the peak (the range of values less that the peak value) was $I_L$ and that the width to the right of the peak was $I_R$. The value $I_L+I_R$ would therefore be the total width in brightness values or bins of the entire histogram.

For each half of the weight function a high weight ($W_{HI-L}$ and $W_{HI-R}$, respectively) a low weight ($W_{LO-L}$ and $W_{LO-R}$, respectively) was chosen. Note that different weights could have been chosen for each interval, but, once again, the inventor found that fewer weights gave satisfactory filtering results yet allowed for faster computations. The order of the weights from the peak outward on either side was: Low (at the peak), High, Low, High (at the tails). Weights were therefore highest where most information about skewness and kurtosis was concentrated.

The width of each interval at the peak was $\frac{1}{2} \cdot d_L$ and $\frac{1}{2} \cdot d_R$; the width of each of the remaining three intervals to the left and right of the peak were $d_L$ and $d_R$, respectively. The intervals at the peak were made narrower because, as is mentioned above, little information is contained just at the normalized peaks. In the implementation, therefore, $d_L=I_L/3.5$ and $d_R=I_R/3.5$. To incorporate skewness information, the ratio of the respective High and Low weights on either side of the peak was set proportional to (in this case, equal to) the reciprocal of the ratio of the widths of the left and right halves (on either side of the peak) of the histogram. Furthermore, the ratio of the High to Low weights was set to a constant.

The following equations thus characterized the weights used in the implementation:

$$(2 \cdot d_L W_{HI-L} + 1.5\, d_L W_{LO-L}) + (2 \cdot d_R W_{HI-R} + 1.5\, d_R W_{LO-R}) = I_L + I_R$$

$$\frac{W_{HI-L}}{W_{HI-R}} = \frac{I_L}{I_R} \; ; \; W_{LO-L} = \gamma \cdot W_{HI-L}; \; W_{LO-R} = \gamma \cdot W_{HI-R};$$

where $d_L = I_L/3.5; \; d_R = I_R/3.5;$ and $0 < \gamma \leq 1$.

Thus:

$$W_{HI-L} = \frac{3.5(I_L+I_R)}{I_R(4+3\gamma)} \; ; \; W_{HI-R} = \frac{3.5(I_L+I_R)}{I_L(4+3\gamma)}$$

The closer to 1.0 the parameter $\gamma$ is set, the "flatter" the weighting function will be on either side of the peak and the less the tails and regions adjacent to the peak will be emphasized. Note that it is not necessary according to the invention even to have a weighting function, although experiments have indicated that weights that emphasize the tails and regions adjacent to the peak of the histogram better incorporate information about skewness and kurtosis and lead to better filtered images.

For each bin i, the weight coefficient $C_i$ in Equation 1 will be the weight W (High or Low, Left or Right) corresponding to the bin's position relative to the peak, that is, corresponding to the brightness interval the bin lies within.

The error function M that was used for similarity calculations in a preferred embodiment of the invention was defined as a Gaussian error function according to the following Equations 2 and 3:

Equation 2: $M(x) = e^{-\beta x^2}$

Equation 3: $\beta = \frac{q \cdot \ln 10}{20\, r^2 D_{max}^2}$

This is a Gaussian error function in which:

$-q$ dB (width)=$r \cdot D_{max}$;

$0 < r < 1$; and $D_{max}$ is the maximum possible absolute error between the values of a bin of the current histogram and the same bin of the reference histogram. For a 7×7 window, $D_{max}=49$, which represents the case in which all pixels in one histogram fell into the bin but none of the pixels of the other histogram fell into this bin.

The error function M thus decreases in value the farther apart two histogram bin values are. The parameters q and r determine how rapidly the error function decreases from its maximum value of 1.0.

Figure 6:
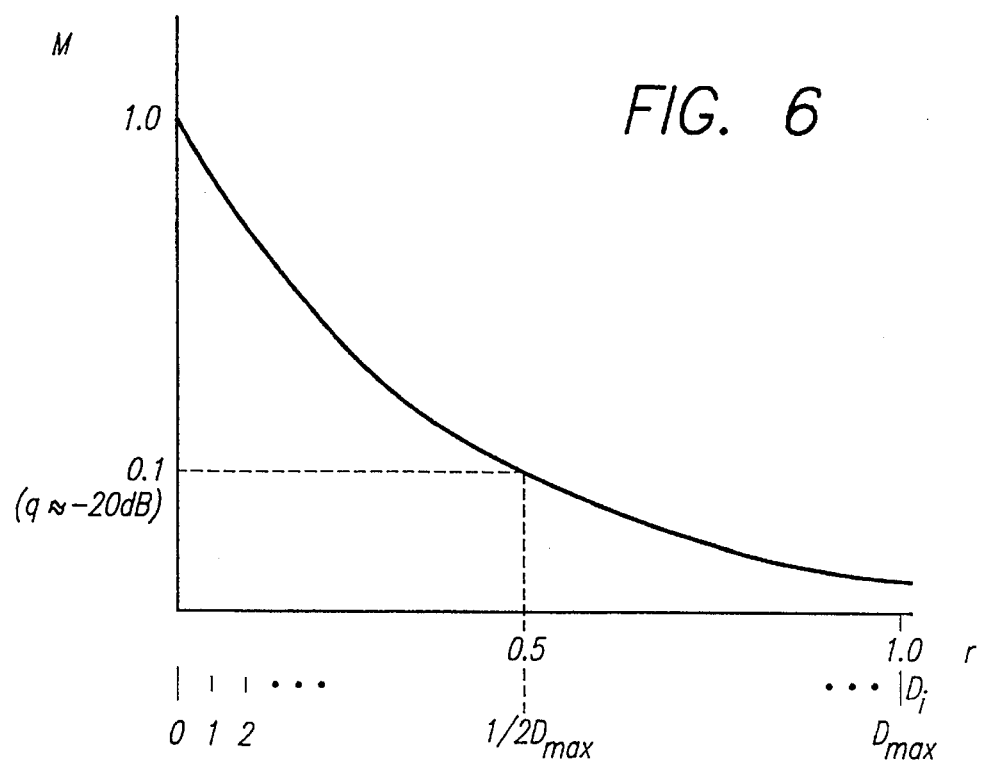
FIG. 6 shows the main properties of a membership or error function used in a preferred embodiment of the invention.

FIG. 6 illustrates the error function using the parameters chosen for one implementation of the invention, namely, for $q=20$ and $r=0.5$. A decrease of 20 decibels ($q=20$) corresponds approximately to a decrease of 90%. With the chosen parameters, the value of the error function therefore decreases to one-tenth its value (to 0.1) when the distance between the histograms is half the maximum possible ($r=0.5$).

Notice that the smaller r is, the larger $\beta$ is (see Equation 3), and therefore the quicker M will fall of from its greatest value of 1.0 (see Equation 2). When r is close to zero, only absolute error values close to zero are interpreted as indicating similarity with the speckle-based reference histogram. The larger r is, the greater the absolute error value must be for the corresponding bin not to be considered speckle. In other words, the parameter r determines how "critical" the system is of differences in values between a bin of the current histogram and a bin of the reference histogram. With q constant, the parameter r is thus a comparison or difference emphasis factor that determines how much the difference in value between a current histogram bin and the corresponding reference histogram bin will influence the smoothing of the current pixel.

The actual parameters one chooses will depend on the application, and may be chosen by experiment. In the preferred embodiment of the invention, however, the value of r is under user control. As FIG. 1 shows, the control device or panel 108 includes a variable speckle growth controller 130, which may be a slide potentiometer, a dial, a numeric keypad, or any other analog or digital conventional input device that allows the user to input a range of values for r from a minimum value (preferably, a small positive number, such as 0.01) to a maximum value (preferably, just less than 1.0, such as 0.99). In the illustrated example, the speckle growth controller 130 is graduated from 0 to 9 to represent the range from the minimum to the maximum pre-set values for r. In FIG. 1, the speckle growth controller is labelled "r" for purposes of illustration only; on an actual control panel, some other more descriptive label such as "speckle growth" would in most cases be preferable to avoid confusion.

The controller 130 preferably also includes an analog-to-digital converter and other signal conditioning equipment as need to provide the input value to the processor 106 in any conventional manner. The processor then stores this value of r, and uses it to calculate β and M as above.

The user will typically set an initial value for r based on experience or a predetermined default. When an image is displayed, the user can then adjust the speckle growth controller 130, thereby changing the parameter r of the adaptive filter according to the invention, until she feels the image is the clearest, with the most speckle filtered out. This step can be performed on a static image at first, as a calibration step, and then, once the proper r value has been set, the system can continue either in a static mode or in a dynamic, real-time mode with continuously updated "cinematographic" or "cine" images. The speckle properties of the interrogation region will seldom change significantly during the period of a normal scan, so the selected value for r can be held as a constant parameter during the scan. If this assumption is not correct, then static images can be produced and r can be adjusted either when speckle seems to be growing too much, or at regular intervals. Notice that, in many applications such as medical ultrasonic imaging, it would be possible to adjust speckle growth as the dynamic image is being displayed, much as one adjusts the settings of a television even though the displayed images are not static.

It is not necessary for the error function to be Gaussian. One could, for example, use the absolute error value, possibly normalized by $D_{max}$, or one could use some other error function. Note that although the invention adopts some model or assumption about the distribution of error from the reference, there is no need, as in conventional systems, to assume that the absolute brightness values of a window as a whole conform to any particular probability distribution. This has at least three advantages: First, one filters images based on their actual distributions (as reflected in the histograms) rather than an assumed distribution. Second, speckle error is easily determined from a continuous error function. Third, the histogram-based system according to the invention is well suited for precomputation and tabulation of possible error/function values, which leads to a corresponding increase in computational efficiency; this is explained further below.

Once the absolute error values $D_i$ are computed for each of the k bins of the current histogram, they are multiplied by their respective weights $C_i$. These products are then used as arguments/or the error function M. The k values of the error function are then used to compute a similarity function S. (Note that, if bins are grouped together as is described above for purposes of weighting, each bin in a group will have the same weight.) The preferred similarity function used in the invention has the following form:

Equation 4: $$S(\gamma, q, r) = \frac{1}{k} \cdot \sum_{i=0}^{(k-1)} M(D_i \cdot C_i)$$

In Equation 4, M is the predefined error function (such as the one defined in Equation 2), $C_i$ is the set of weights (if any are used), and γ, q and r are the preselected parameters described above (if M is the Gaussian error/function). Note that if the current histogram is exactly the same as the reference histogram, then all k absolute error values $D_i$ will be zero, all k error function values will be one ($e^0$) and the similarity function S will also be equal to one, after division by k. The constant 1/k therefore normalizes S so that the similarity function will have a maximum possible value of 1.00 and a minimum possible value very close to zero. Since k is preferably a constant for all histograms in an image, the step of dividing by k can be omitted without sacrificing any information; however, since k will normally be a power of two, the division can be done quickly (thereby providing the benefits of normalization) by right shifting of the data word containing the sum of absolute error function values. The similarity function S compares the current histogram as a whole with the reference histogram.

Notice that the only unknowns during calculation of the similarity function are the absolute error values $D_i$—all other values are indices or parameters (such as the weights $C_i$) that are known or can be predetermined using the criteria discussed above. Notice also that the absolute error values $D_i$ will be integers from zero to $D_{max}$, which is equal to the number of pixels in a window (here, 49). Because of this, for each bin, the error function M can take only $D_{max}+1$ possible values, all of which can be precomputed. For k=16 and $D_{max}=49$, these values can be tabulated in an error function look-up table as follows:

TABLE 2

| Bin/Group | Absolute error $D_i$ | | | | | | | |
|---|---|---|---|---|---|---|---|---|
| | 0 | 1 | 2 | 3 | 4 | 5 | $D_{max}-1$ (48) | $D_{max}$ (49) |
| 15 | 1.0 | $M(C_{15})$ | $M(2 \cdot C_{15})$ | $M(3 \cdot C_{15})$ | $M(4 \cdot C_{15})$ | $M(5 \cdot C_{15})$ | $M(48 \cdot C_{15})$ | $M(49 \cdot C_{15})$ |
| 14 | 1.0 | $M(C_{14})$ | $M(2 \cdot C_{14})$ | $M(3 \cdot C_{14})$ | $M(4 \cdot C_{14})$ | $M(5 \cdot C_{14})$ | $M(48 \cdot C_{14})$ | $M(49 \cdot C_{14})$ |
| 13 | 1.0 | $M(C_{13})$ | $M(2 \cdot C_{13})$ | $M(3 \cdot C_{13})$ | $M(4 \cdot C_{13})$ | $M(5 \cdot C_{13})$ | $M(48 \cdot C_{13})$ | $M(49 \cdot C_{13})$ |
| 12 | 1.0 | $M(C_{14})$ | $M(2 \cdot C_{14})$ | $M(3 \cdot C_{14})$ | $M(4 \cdot C_{14})$ | $M(5 \cdot C_{14})$ | $M(48 \cdot C_{14})$ | $M(49 \cdot C_{14})$ |
| 11 | 1.0 | $M(C_{11})$ | $M(2 \cdot C_{11})$ | $M(3 \cdot C_{11})$ | $M(4 \cdot C_{11})$ | $M(5 \cdot C_{11})$ | $M(48 \cdot C_{11})$ | $M(49 \cdot C_{11})$ |
| 10 | 1.0 | $M(C_{10})$ | $M(2 \cdot C_{10})$ | $M(3 \cdot C_{10})$ | $M(4 \cdot C_{10})$ | $M(5 \cdot C_{10})$ | $M(48 \cdot C_{10})$ | $M(49 \cdot C_{10})$ |
| 9 | 1.0 | $M(C_9)$ | $M(2 \cdot C_9)$ | $M(3 \cdot C_9)$ | $M(4 \cdot C_9)$ | $M(5 \cdot C_9)$ | $M(48 \cdot C_9)$ | $M(49 \cdot C_9)$ |
| 8 | 1.0 | $M(C_8)$ | $M(2 \cdot C_8)$ | $M(3 \cdot C_8)$ | $M(4 \cdot C_8)$ | $M(5 \cdot C_8)$ | $M(48 \cdot C_8)$ | $M(49 \cdot C_8)$ |
| 7 | 1.0 | $M(C_7)$ | $M(2 \cdot C_7)$ | $M(3 \cdot C_7)$ | $M(4 \cdot C_7)$ | $M(5 \cdot C_7)$ | $M(48 \cdot C_7)$ | $M(49 \cdot C_7)$ |
| 6 | 1.0 | $M(C_6)$ | $M(2 \cdot C_6)$ | $M(3 \cdot C_6)$ | $M(4 \cdot C_6)$ | $M(5 \cdot C_6)$ | $M(48 \cdot C_6)$ | $M(49 \cdot C_6)$ |
| 5 | 1.0 | $M(C_5)$ | $M(2 \cdot C_5)$ | $M(3 \cdot C_5)$ | $M(4 \cdot C_5)$ | $M(5 \cdot C_5)$ | $M(48 \cdot C_5)$ | $M(49 \cdot C_5)$ |
| 4 | 1.0 | $M(C_4)$ | $M(2 \cdot C_4)$ | $M(3 \cdot C_4)$ | $M(4 \cdot C_4)$ | $M(5 \cdot C_4)$ | $M(48 \cdot C_4)$ | $M(49 \cdot C_4)$ |
| 3 | 1.0 | $M(C_3)$ | $M(2 \cdot C_3)$ | $M(3 \cdot C_3)$ | $M(4 \cdot C_3)$ | $M(5 \cdot C_3)$ | $M(48 \cdot C_3)$ | $M(49 \cdot C_3)$ |
| 2 | 1.0 | $M(C_2)$ | $M(2 \cdot C_2)$ | $M(3 \cdot C_2)$ | $M(4 \cdot C_2)$ | $M(5 \cdot C_2)$ | $M(48 \cdot C_2)$ | $M(49 \cdot C_2)$ |
| 1 | 1.0 | $M(C_1)$ | $M(2 \cdot C_1)$ | $M(3 \cdot C_1)$ | $M(4 \cdot C_1)$ | $M(5 \cdot C_1)$ | $M(48 \cdot C_1)$ | $M(49 \cdot C_1)$ |
| 0 | 1.0 | $M(C_0)$ | $M(2 \cdot C_0)$ | $M(3 \cdot C_0)$ | $M(4 \cdot C_0)$ | $M(5 \cdot C_0)$ | $M(48 \cdot C_0)$ | $M(49 \cdot C_0)$ |

This table is therefore defined such that, for bin j and absolute error=i, the tabulated error function value is $M(i-C_j)$.

If the bins are grouped so as to reduce the number of weights (for example, into the eight groups discussed above, then the error function value table will only need as many rows as there are groups. Note also that the first column contains all zeroes because $M(0 \cdot C_i) = e^0 = 1.0$ regardless of the weight $C_i$. Once the weight s are chosen, the error/function value table can be pre-stored in memory as look-up table, that is, as an array of constants.

Assume now that a current histogram is compiled and compared with the reference histogram. For each bin i (or group of bins), the absolute error value $D_i$ is determined according to Equation 1. The processor then addresses the error function look-up table at row i and fetches the table value for the column equal to $D_i$. This value will be the precomputed error function value for the bin. The error function values for all bins are looked up, added, and scaled (if the normalization step is included—see Equation 4) to yield the value of the similarity function S (see Equation 4) for the window around the current pixel. Notice that this similarity value can be determined very quickly, since, for k bins, it requires only k table look-ups, k additions, and one division; furthermore, since k is preferably a power of two, the division can be accomplished by simple right-shifting of the summed look-up values.

An alternative embodiment of the invention incorporates the inventor's theoretical and experimental determination that it is possible to forego weights $C_i$, normalization, and histogram shifting if the number of bins is reduced from 16 to eight for a 7×7 window for typical ultrasound images. The similarity function then can be reduced to:

Equation 5: $$S(q,r) = \frac{1}{k} \cdot \sum_{i=0}^{(k-1)} M(D_i)$$

Moreover, since no weights are needed (which is equivalent to setting $C_i=1.0$ for all i), the error function look-up table (Table 2) can be reduced to a single row. Instead of histogram shifting, an indexing scheme was used whereby the absolute error values were calculated for the peak bins of the reference and current histograms, and then the absolute error values were calculated outward from the peak bins on either side, so that the first bins greater than the peak were compared, then the second bins, and so on, until all eight bins were compared. Standard statistical calculations and conventional experiments will determine whether weights, normalization, and shifting are required for any given area of application.

Using the preferred error function (Equation 2) and similarity function (Equation 4 or Equation 5), the similarity value S for each pixel in the image will lie in the range [$\epsilon$, 1.0] where $\epsilon$ is a very small value (for $D_{max}=49$, $\epsilon=e^{-49 \cdot \beta}$).

Now recall that the reference histogram is compiled for a window around a reference pixel, and that one chooses a reference pixel in a region of the image one assumes to be in a region that is substantially acoustically homogeneous except for speckle. The more the current histogram resembles the reference histogram (the closer to 1.0 the similarity value is), the more likely it is that the current window also represents a speckle region. The more likely the region is a speckle region, the more one can assume that the region is homogeneous, so that the image in the region should be "smooth," with a more uniform brightness. The invention incorporates these assumptions by updating the current pixel as a predetermined function of its similarity value; in particular, the higher the similarity value is for the pixel, the greater it is smoothed, that is, made similar in brightness to the pixels around it.

The updating procedure can have various degrees of complexity.

Let p=the actual brightness value of the current pixel;

$\bar{p}$=the average brightness value for pixels in the current window, or in some subset of the current window; this average value may be the arithmetic mean (weighted or raw), a median value (also weighted or raw), or some other average, which, preferably, should be easy to calculate quickly; note that the mean or median can be calculated quickly and easily using known techniques during compilation of the histogram; and $p^*$=the updated value of the current pixel, that is, the brightness value it will be assigned and with which it will be displayed after filtering using the invention.

One of the simpler (and hence faster) updating steps would be to set $p^*=\bar{p}$ if the similarity value S (Equation 4) for the pixel exceeds a predetermined threshold $S_t$, but is left unchanged otherwise.

An alternative updating procedure is to leave the pixel brightness unchanged if its similarity value S it is no greater than the threshold $S_t$, but to interpolate it between p and $\bar{p}$ otherwise. Thus:

$$p^* = \begin{cases} \bar{p} + (1-S) \cdot (p-\bar{p}) & \text{if } S > S_t \\ p & \text{otherwise} \end{cases}$$

Note that the greater the similarity value is, the more the pixel will be smoothed, that is, the closer it will be set to the local average brightness $\bar{p}$. In this case, however, the level of smoothing is determined wholly by the similarity value of the pixel. In order to give the user some control over the degree of smoothing, a smoothing coefficient or factor c may be introduced so that $p^*=\bar{p}+(1-cS) \cdot (p-\bar{p})$ if $S>S_t$, where c is preferably chosen so that the range of $(1-cS)$ will always be [0, 1]. If the user sets c=1/S, then the updated value $p^*$ takes the value of maximum smoothing. If the user sets c=0, then there will be no smoothing of the pixels (their brightnesses will not change). The degree of smoothing for 0<c<1/S will depend on how the user sets c. Notice that the factor c acts as a weight for the similarity value S.

In a preferred embodiment of the invention, this idea is taken further. In the preferred embodiment, more than one threshold value is chosen, and pixels were updated according to the following procedure:

$$p^* = \begin{cases} p & \text{if } S < S_t^{(1)} \\ \bar{p}_{3\times3} + (1-cS)(p - \bar{p}_{3\times3}) & \text{if } S_t^{(1)} \geq S > S_t^{(2)} \\ \bar{p}_{5\times5} + (1-cS)(p - \bar{p}_{5\times5}) & \text{if } S \geq S_t^{(2)} \end{cases}$$

where $\bar{p}_{3\times3}$ and $\bar{p}_{5\times5}$ are the average brightness values of the 3×3 window and 5×5 window, respectively, around the current pixel and $S_t^{(1)}$ and $S_t^{(2)}$ are two predetermined threshold similarity values. As before, c preferably lies in the range [0, 1/S]. If the histogram for the current pixel is very different from the reference histogram (S is less than the lower threshold $S_t^{(1)}$), then it is assumed that it is not in a speckle region, so that its value is left unchanged. If the current histogram is moderately similar to the reference histogram (S lies between the threshold values, or at the lower one), then the influence of speckle is assumed to be moderate and localized, and the pixel is moderately smoothed: the brightness of the pixel after updating is interpolated between its unchanged value and the average brightness of a smaller 3×3 window (a subset of the current 7×7 window) around the pixel.

If the current histogram is strongly similar to the reference histogram (S lies between the threshold values, or at the lower one), then the influence of speckle is assumed to be strong and the pixel is strongly smoothed: the brightness of the pixel after updating is interpolated between its unchanged value and the average brightness of a larger 5×5 window (which is still a subset of the current 7×7 window) around the pixel. The constant c determines how much smoothing is applied within each interval.

It is preferable for the value (1−cS) always to lie in the range [0, 1] to ensure that the user can select the degree of smoothing for the entire image (the value of S changes from pixel to pixel). Ideally, setting a single parameter should suffice to ensure that $(1-cS) \in [0, 1]$ for every pixel, that is, for all values of S; this also would make it possible to accurately calculate and control the quantization error for the smoothing operation for every pixel.

In one prototype of the invention, these features were implemented using an input parameter $k_s$ with a range [0, 15] and a default value of $k_s=10$ (for the sake of ease of storage and calculation). Two constant vectors $LS_A$ and $LS_B$ were then defined as follows:

$$LS_A(k_s) = \begin{cases} 1 & \text{for} \quad 0 \leq k_s \leq 10 \\ 1 - 0.2(k_s - 10) & \text{for} \quad 11 \leq k_s \leq 15 \end{cases}$$

$$LS_B(k_s) = \begin{cases} -0.1 k_s & \text{for} \quad 0 \leq k_s \leq 10 \\ -1 + 0.2(k_s - 10) & \text{for} \quad 11 \leq k_s \leq 15 \end{cases}$$

Both of these constant vectors can and preferably are precomputed and stored in memory. The input value of $k_s$ then served as the index to look-up elements in the vectors to compute the value (1−cS) as follows:

$$(1-cS) = LS_A(k_s) + LS_B(k_s) \cdot S; \quad 0 \leq k_s \leq 15$$

After the updating steps are performed, the current pixel p is displayed with the brightness of its updated value $p^*$.

The actual value of $k_s$ one chooses will depend on the application, and may be chosen by experiment. In the preferred embodiment of the invention, however, the value of ks is under user control. As FIG. 1 shows, the control device or panel 108 includes a variable smoothness controller 130, which, like the speckle growth controller 130, may be a slide potentiometer, a dial, a numeric keypad, or any other analog or digital conventional input device that allows the user to input a range of values for ks from a minimum value such as zero to a maximum value such as 15. The controller 140 preferably also includes an analog-to-digital conveter and other signal conditioning equipment as need to provide the input value to the processor 106 in any conventional manner. The processor then stores this value of ks, and uses it to calculate the degree of smoothing of the pixels as explained above. In FIG. 1, the smoothness controller is labelled "$k_s$" for purposes of illustration only; on an actual control panel, some other more descriptive label such as "smoothness" would in most cases be preferable to avoid confusion.

When an image is displayed, the user can then adjust the smoothness controller 130, thereby changing the parameter $k_s$ of the adaptive filter according to the invention, until she feels the image is the clearest, with the most speckle filtered out. As for the speckle growth parameter r, this step can be performed on a static calibration image, or it can be adjusted as dynamic images are being displayed.

Threshold values used in the smoothing steps may be set in various ways. Examples include: 1) they may be fixed for any application based on experiment or calculations; 2) they may be calculated using some predetermined function of the properties of the reference histogram or some other properties of a calibration image; or 3) they may be user-adjustable, in which case additional conventional controls (similar to the speckle growth and smoothness controllers) will be included in the control panel.

Manual selection of the reference pixel is described above. As an alternative, once an image is displayed on the screen 116, the user can set the selector 126 (FIG. 1) into the automatic position. The processor can then select the reference pixel automatically. One way to do this is using a Monte Carlo approach, in which a number of "test" pixels are chosen at random from the image. Alternatively, a preselected, regularly spaced grid of pixels can be used. The number of pixels chosen can be determined in advance by conventional experiments and calculations for each area of application in order to optimize the statistical likelihood (versus memory requirements and computation time) that a proper reference pixel will be included in the randomly chosen group.

For each pixel, a histogram for a window about the pixel can be compiled. The histogram with the least kurtosis or standard deviation of brightness values can then be assumed to correspond most probably to a speckle region and the corresponding window can be used as the reference window. Note that if there is enough memory space available in the memory 122, then some or all of the windows thus compiled may be stored, so that it will later not be necessary to compile them again for comparison with the reference window and smoothing of the corresponding pixels.

As another alternative, the histograms for the selected "test" reference pixels are displayed as such on the display. The user then decides by visual inspection which histogram best conforms to the known properties of a homogeneous speckle region and selects the corresponding pixel as the reference pixel. As yet another alternative, other known methods, such as procedures for detecting edges of image features, may be used to determine a reference pixel automatically.

It is also possible according to the invention for the window size to be selected automatically. Similar to automatic reference point selection, for each of a number of randomly displayed pixels, the statistical properties of differently sized windows about randomly distributed or preselected pixels can be examined to determine for what window size additional pixels do not significantly change the mean, kurtosis and skewness properties of the corresponding histograms according to a predetermined conventional measure. Windows larger than this size would not be needed to provide acceptable smoothing.

The process of compiling a current histogram, comparing it with the reference histogram, computing a similarity value, and updating the pixel brightness as a function of the similarity value is carried out for all pixels in the displayed image, with certain exceptions. The exceptions are those pixels that lie so close to the edge of the image that it is not possible to form a 7×7 window (or whatever dimensions are chosen) around the pixels. In this case, the pixels are preferably left unchanged. Other alternatives, however, are to use smaller windows, to assume pixels in the "window" that lie outside the image are equal in brightness to the current pixel or to some default value, or to some average of adjacent actual pixels. If smaller windows are used, one should analyze theoretically and test experimentally whether the chosen "edge" windows provide statistically reliable information. A typical sonogram is made up of a pixel matrix on the order of 256×512 or 512×512 pixels, so in most cases there will be little or no loss of quality in the filtered image by excluding the edge pixels from filtering.

In moving from pixel to pixel in the image, it is preferable to update pixels in a row-by-row or column-by-column manner. For example, for row-by-row updating (filtering), once one pixel is updated, the pixel adjacent to it (for example, to the right) in the same row is designated as the current pixel, to be updated next. For a 7×7 window, notice that only seven pixels (those in the left-most window column) of the previous window will not be in the current window; only the pixels in the right-most row of the new current window will not already have been included in the previous current histogram. Consequently, there is no need to recompile the entire histogram; rather, the values of the now excluded column are removed from the new current histogram and the values in the new column are added into the histogram. A new peak bin is then determined and the histogram bins are renormalized.

Figure 7:
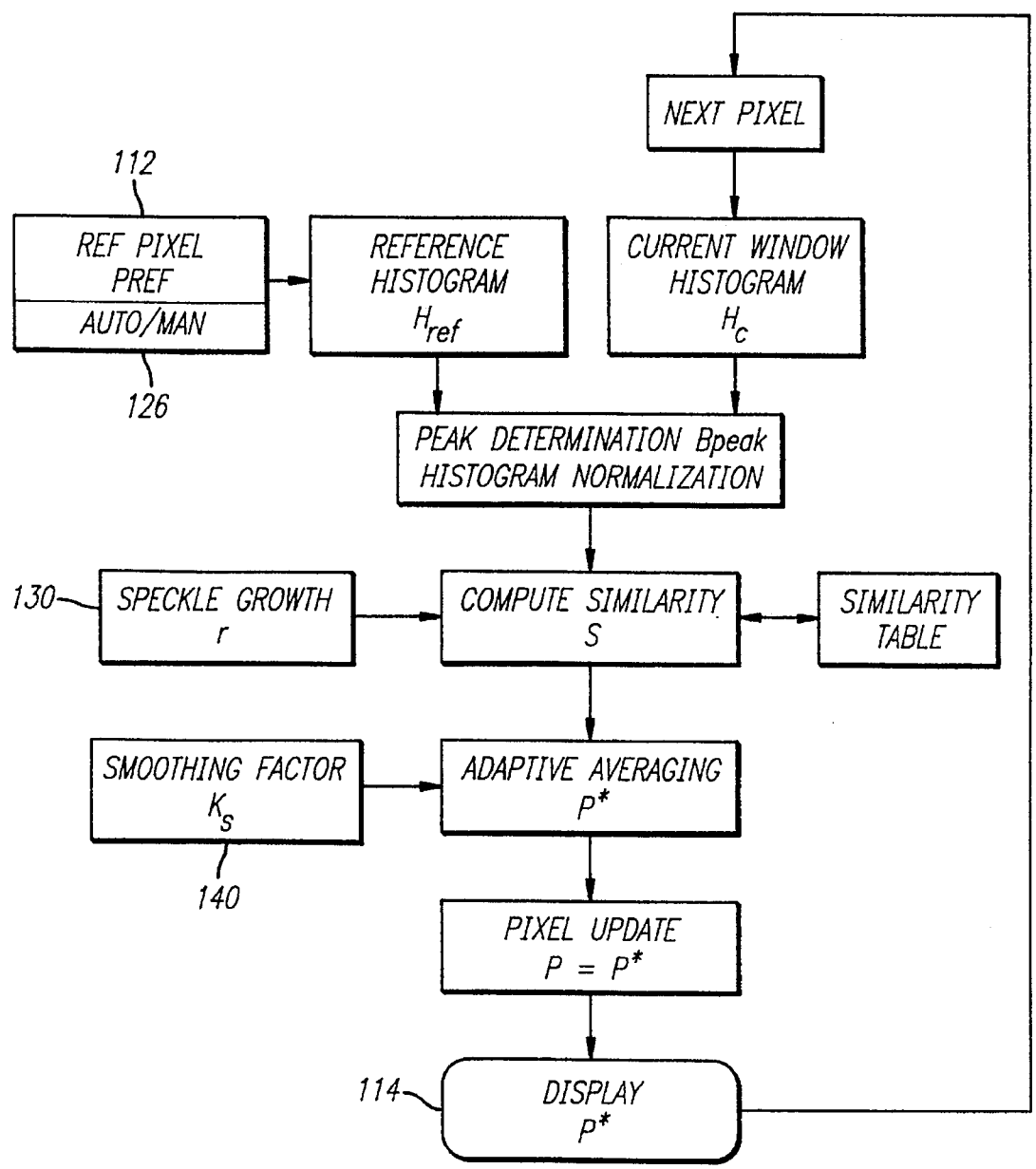
FIG. 7 shows the main functional blocks of the invention.

FIG. 7 shows the main functional blocks of the preferred embodiment of the invention. The main steps of the invention are: generating at least a two-dimensional image (which may be one of a series of images) made up of pixels and determining necessary parameters; compiling a reference histogram about a reference pixel and computing a similarity value for all other pixels; adaptively smoothing each pixel as a function of its similarity value; and displaying the smoothed pixels.

Notice that the filtering subsystem of the invention has as an input at least one image of at least two-dimensions. The invention is described above with reference to two-dimensional images since this is at present the most common form of presenting the results of scans of an interrogation region. The invention is not, however, restricted to two-dimensional imaging. Rather, because of the computational efficiency of the invention, with its "off-line" precomputation of tables and relatively low number of required time-consuming multiplication operations, the invention is well-suited for filtering images of higher dimensions.

As an example, there is now much research underway in the field of medical imaging to develop three-dimensional ultrasonic scans. Typically, these scanning operations involve imaging an interrogation volume as a series of two-dimensional layers or cross-sections. Processing can then be done on the three-dimensional data. Not only does 3-D imaging allow for different views of the interrogation volume, but it often leads to better filtered two-dimensional images (cross-sections of the 3-D image) since the signals in adjacent layers are usually correlated.

In the context of the invention, for three-dimensional filtering, the user (or the system itself) will select a reference volume element ("voxel"—a 3-D "pixel") from the displayed interrogation volume. Whether the image is two-dimensional, with a reference pixel, or of greater dimension, with a reference voxel of corresponding dimension, this step is the same: the user selects a reference point or element within the image.

The user then selects a speckle growth factor r and a smoothing factor $k_s$ as before. A reference histogram is then compiled for all the image elements (in this case, voxels) in a chosen or predetermined reference region or "box" (analogous to the windows above), for example, the 5×5×5 or 7×7×7 cube that includes the reference voxel, preferably at its center (for symmetry). The brightness values for each voxel in the box are then accumulated in a predetermined number of bins. As before, the number of bins will be determined mostly by the number of possible brightness values for a given voxel. For each image element, a current histogram is then compiled for the values of the elements in a current region (for 3-D, the "box") around the reference element. The steps for determining similarity, adaptively smoothing each image element or voxel in the entire interrogation region, and redisplaying the voxels in the interrogation region will be the same or closely analogous to the 2-D case described above.

Using the invention for filtering images of greater than two dimensions requires correspondingly greater memory capacity and longer processing time than a two-dimensional image; the acceptable limits for data storage and processing speed will depend on the application and the type of processor one chooses. Instead of a single processor, it is also possible according to the invention to have separate processors or processing circuitry dedicated to each of the most time-consuming repeated sub-steps of the invention: histogram compilation, similarity calculations, and pixel updating. These sub-steps may be performed in parallel for different pixels or voxels to increase processing speed. Note that, regardless of the speed of the chosen processor, the invention will be faster than systems that rely on a large number of calculations of exponential or other non-tabulated functions.

The invention is illustrated above mostly in an application in which the brightness of a pixel is the property used to determine its displayed, updated, filtered value. This is common but not necessary to the invention. Other properties may be used, as long as they can be assigned numerical values that relate to the property of interest of the portions of the interrogation region. For example, color, velocity, phase or frequency shift (for example, for Doppler-based scanning systems) could be used rather than brightness (signal strength) as the displayed property. The numerical values of these properties can be compiled in histogram bins just as brightness values, and they can be processed in the same manner.

I claim:

1. A method for imaging an interrogation region, comprising the following steps:

A. generating a multi-dimensional image of the interrogation region as a pattern of image elements;

B. assigning to each image element one of a predetermined, finite number of numerical values corresponding to a predetermined imaging property of the interrogation region;

C. displaying the image on a display;

D. selecting a reference element in a substantially homogeneous portion of the displayed image;

E. accumulating in a reference histogram a reference frequency distribution of the numerical values of all image elements in a reference region, which includes the reference element;

F. sequentially designating each image element as a current element;

G. for each current element, accumulating in a current histogram a current frequency distribution of the numerical values of all image elements in a current region, which includes the current element;

H. for each current element, determining a similarity value between the reference histogram and the current histogram; and I. displaying each current element with an updated, filtered value, which is a predetermined filtering function of the corresponding similarity value.

2. A method as defined in claim 1, in which:

A. the similarity value is generated from a similarity function, which includes a comparison factor;

B. when the comparison factor is at a first value, the similarity function has a predetermined minimum value; and C. when the comparison factor is at a second value, the similarity function has a predetermined maximum value;

further including the following step:

D. adjusting the comparison factor until a user-defined noise removal level is reached for the displayed image.

3. A method as defined in claim 2, further including the following steps:

A. storing the reference histogram in a plurality of reference memory locations as a plurality of reference bins, in which each reference bin corresponds to a predetermined range of numerical values of the imaging property, and into each of which is accumulated the number of image elements in the reference region whose numerical values fall within the range of the corresponding bin;

B. storing the current histogram in a plurality of current memory locations as a plurality of current bins corresponding in number and numerical ranges to the reference bins of the reference histogram, and in which into each current bin is accumulated the number of image elements in the current region whose numerical values fall within the range of the corresponding current bin;

C. for each reference bin and corresponding current bin, generating an error function value;

D. generating the similarity value as a predetermined similarity function of the error function values; and E. prestoring in a memory unit all possible error function values for arbitrary reference bins and current bins.

4. A method as defined in claim 3, further including the following steps:

A. determining the reference histogram bin in whose range a greatest number $B_{peak}$ of reference elements' numerical values lie;

B. for each current histogram, determining the current histogram bin in whose range the greatest number of current elements' numerical values lie;

C. scaling all bins of the current histogram by a normalization factor and assigning to the bin in whose range the greatest number of elements' numerical values lie the value $B_{peak}$; and D. prestoring in the memory unit all possible normalization factors for the given number of image elements in the reference region.

5. A method as defined in claim 4, further including the following steps:

A. partitioning the histograms into left and right halves, with an equal number of bins in either half;

B. adjusting the ranges of the bins in the left and right halves, respectively, to be proportional to respective total widths of the left and right halves;

C. generating the error function values as a function of separate weights for histogram bins in the left and right halves, with the weights proportional to a reciprocal of a ratio of the total widths of the left and right halves; and D. whereby the similarity function is a function of skewness of the histograms.

6. A method as defined in claim 1, further including the following steps:

A. displaying each current element with a respective numerical value in a range from its unchanged value to a maximum filtered value as a function of the corresponding similarity value and a smoothing factor; and B. adjusting the smoothing factor until a user-defined noise removal level is reached for the displayed image.

7. A method as defined in claim 6, further including the following steps:

A. setting a predetermined number of similarity ranges;

B. for each similarity range and for each current element, storing a corresponding average sub-region value that is an average of the numerical values of the image elements in a corresponding sub-region, which includes the current element, of the current region; and C. displaying each current element with a respective numerical value in a range from its unchanged value to the average sub-region value of the sub-region in whose range the similarity value of the current element lies.

8. A method as defined in claim 1, comprising the following steps:

A. defining the interrogation region as a portion of a patient's body;

B. generating the multi-dimensional image of the interrogation region as a two-dimensional image by applying to the interrogation region an ultrasonic scan signal, sensing a corresponding ultrasonic return signal, and by converting the ultrasonic return signal into the pattern of pixels;

C. assigning to each pixel one of a predetermined, finite number of brightness values corresponding to a predetermined acoustic property of a corresponding portion of the interrogation region; and D. selecting as the reference element a reference pixel in the substantially homogeneous portion of the displayed image such that pixels in the substantially homogeneous portion with substantially different displayed brightness values than those of adjacent pixels can be assumed to result from speckle noise.

9. A method as defined in claim 1, in which the step of selecting a reference element includes the steps of automatically comparing predetermined statistics of a plurality of unfiltered image elements and of selecting as the reference element the one of the unflitered image element whose statistics most closely correspond to a predetermined homogeneity condition.

10. An ultrasonic imaging method comprising the following steps:

A. selecting as an interrogation region a portion of a patient's body;

B. generating a multi-dimensional image of the interrogation region as a two-dimensional image by applying to the interrogation region an ultrasonic scan signal, sensing a corresponding ultrasonic return signal, and by converting the ultrasonic return signal into the pattern of pixels;

C. assigning to each pixel one of a predetermined, finite number of brightness values corresponding to a predetermined acoustic property of a corresponding portion of the interrogation region;

D. selecting a reference pixel in a substantially homogeneous portion of the displayed image such that pixels in the substantially homogeneous portion with substantially different displayed brightness values than those of adjacent pixels can be assumed to result from speckle noise;

E. accumulating in a reference histogram a reference frequency distribution of the numerical brightness values of all pixels in a reference region, which includes the reference pixel;

F. storing the reference histogram in a plurality of reference memory locations as a plurality of reference bins, in which each reference bin corresponds to a predetermined range of numerical brightness values, and into each of which is accumulated the number of image pixels in the reference region whose numerical brightness values fall within the range of the corresponding bin;

G. sequentially designating each pixel as a current pixel;

H. for each current pixel, accumulating in a current histogram a current frequency distribution of the numerical values of all pixels in a current region, which includes the current pixel;

I. storing the current histogram in a plurality of current memory locations as a plurality of current bins corresponding in number and numerical ranges to the reference bins of the reference histogram, and in which into each current bin is accumulated the number of pixels in the current region whose numerical brightness values fall within the range of the corresponding current bin;

J. determining the reference histogram bin in whose range a greatest number $B_{peak}$ of reference pixels' brightness values lie;

K. for each current histogram, determining the current histogram bin in whose range the greatest number of current pixels' numerical values lie;

L. scaling all bins of the current histogram linearly by a normalization factor and, to the bin in whose range the greatest number of pixels' numerical values lie, assigning the value $B_{peak}$; and M. prestoring in the memory unit all possible normalization factors for the given number of image elements in the reference region;

N. for each reference bin and corresponding current bin, generating an error function value;

O. prestoring in a memory unit all possible error function values for arbitrary reference bins and current bins.

P. fix each current pixel, generating a similarity value between the reference histogram and the current histogram as a predetermined similarity function of the error function values; in which:
1) the similarity value is generated from a similarity function, which includes a comparison factor;
2) when the comparison factor is at a first value, the similarity function has a predetermined minimum value; and
3) when the comparison factor is at a second value, the similarity function has a predetermined maximum value;

Q. adjusting the comparison factor until a user-defined noise removal level is reached for the displayed image;

R. displaying each current pixel with a respective numerical brightness value in a range from its unchanged value to a maximum filtered value as a function of the corresponding similarity value and a smoothing factor;

S. adjusting the smoothing factor until a user-defined noise removal level is reached for the displayed image; and T. displaying each current pixel with an updated, filtered brightness value, which is a predetermined filtering function of the corresponding similarity value.

11. A system for imaging an interrogation region, comprising:

A. a source of a scanning signal which has, as an unformed output, a received imaging signal corresponding to a predetermined imaging property of the interrogation region;

B. a signal converter that has, as an unformed input, the received imaging signal, and that has a formed output corresponding to a multi-dimensional image of the interrogation region as a pattern of image elements, with each image element having one of a predetermined, finite number of numerical values corresponding to the predetermined imaging property of the interrogation region;

C. a display means for displaying the image as the pattern of image elements;

D. reference selection means for selecting one of the displayed image elements as a reference element in a substantially homogeneous portion of the displayed image;

E. reference accumulation means for accumulating and storing reference histogram values in a memory unit for a reference frequency distribution of the numerical values of all image elements in a reference region, which includes the reference element;

F. current accumulation means for sequentially designating each image element as a current element, and, for each current element, for accumulating and storing current histogram values in the memory unit for a current frequency distribution of the numerical values of all image elements in a current region, which includes the current element; and G. filtering means:
1) for determining a similarity value between the reference histogram values and the current histogram values; and
2) for changing for display the corresponding numerical value for each current pixel to an updated value as a predetermined filtering function of the corresponding similarity value.

12. A system as defined in claim 11, further comprising:

A. comparison adjustment means for setting a histogram comparison factor from a minimum to a maximum value, in which:

B. the similarity value is a predetermined similarity function of the comparison factor such that, when the comparison factor is at a first value, the similarity function has a predetermined minimum value, and, when the comparison factor is at a second value, the similarity function has a predetermined maximum value.

13. A system as defined in claim 11, further comprising:

A. smoothness adjustment means for setting a histogram smoothness factor from a minimum to a maximum value, in which:

B. when the smoothness factor is at a first value, a maximum possible degree of change between each current pixel and its updated value is at a predetermined minimum; and C. when the smoothness factor is at a second value, the maximum possible degree of change between each current pixel and its updated value is at a predetermined maximum.

14. A system as defined in claim 11, in which the source of the scanning signal is an ultrasonic transducer.

15. A system as defined in claim 11, in which the reference selection means is an automatic reference identification means for comparing predetermined statistics of a plurality of unfiltered image elements and for selecting as the reference element the one of the unflitered image element whose statistics most closely correspond to a predetermined homogeneity condition.

* * * * *